May 17, 1927.

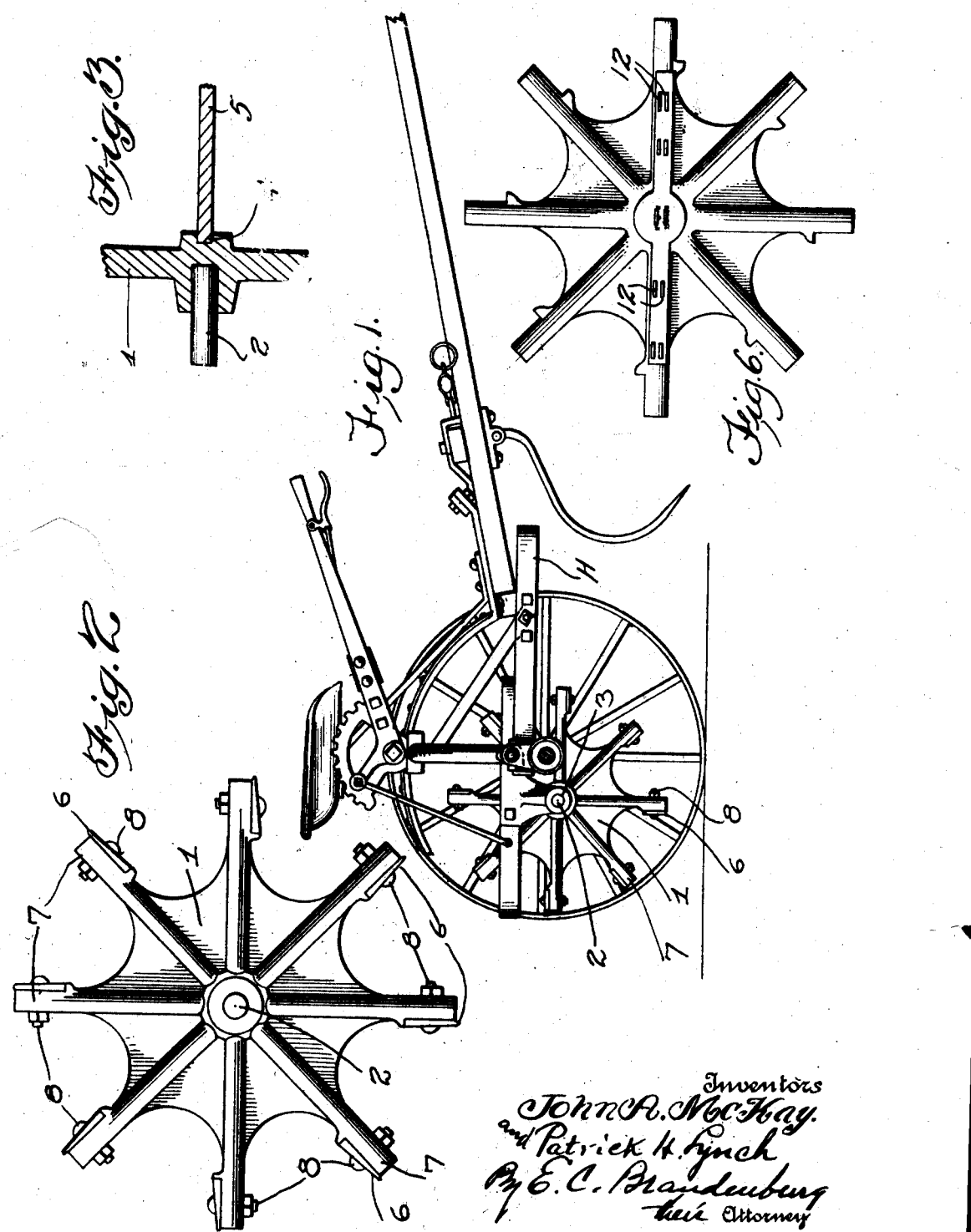

J. A. McKAY ET AL

STALK CUTTER

Filed March 1, 1926

Inventors
John A. McKay.
Patrick H. Lynch
By E. C. Brandenburg
their Attorney

Patented May 17, 1927.

1,628,730

UNITED STATES PATENT OFFICE.

JOHN A. McKAY AND PATRICK H. LYNCH, OF DUNN, NORTH CAROLINA, ASSIGNORS TO THE JOHN A. McKAY MANUFACTURING COMPANY, INC., OF DUNN, NORTH CAROLINA, A CORPORATION OF NORTH CAROLINA.

STALK CUTTER.

Application filed March 1, 1926. Serial No. 91,414.

Our invention relates to an improvement in stalk cutters.

The present invention is an improvement on the stalk cutter disclosed in Letters Patent No. 931,635, granted to John A. McKay, August 17, 1909.

The present invention has to do particularly with what is generally termed the cutting reel or cylinder of a stalk cutter and the object is to provide a device of this character which will be non-chokable.

The difficulties experienced in the past with devices of this character is that the cutting cylinder becomes clogged up with stalks and dirt, so that it entails a great deal of labor and involves difficulty to get it cleaned out so that the cutter will perform its functions.

All of this is overcome and obviated in our present invention, which consists of a replaceable partition extending through the center of the cylinder. This may be in the form of a board or boards having their edges held in grooves in the opposite cylinder spiders and held in place by the cutter blades bolted across the opposite ends of the board or boards; or it might be done in a great variety of ways.

In the accompanying drawings:—

Fig. 1 is a view in side elevation of our improved stalk cutter;

Fig. 2 is a view from the outside of one of the cylinder spiders;

Fig. 3 is a section through the center of the same;

Figs. 6 and 7 show slight modifications.

The numeral 1 represents the cylinder spider. There are two of these and they are provided with trunnions 2, which turn in the bearing-boxes 3 secured to the frame of the machine H. On the inner surface of each spider, a groove 4 is cast, and these grooves, in the two spiders, fall opposite each other and are in the same plane.

Figure 4:
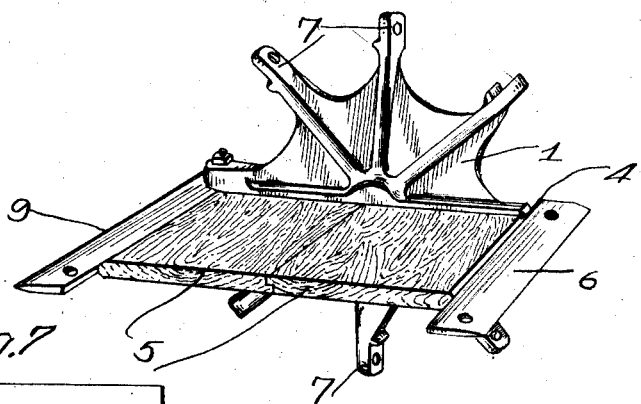
Fig. 4 is a view in perspective showing the board or boards in place in the groove of one of the spiders.

The partition 5 is preferably made in two parts as shown in Fig. 4 and the opposite edges are held in these two oppositely located grooves 4.

In assembling the parts, blades or cutters 6 are bolted to the ends 7 of the spider by means of bolts 8, (see Fig. 2). These are all bolted in place except the blade or cutter 9, which is left for the last and, after the partition 5 is driven through the grooves until it comes into contact with the inner edge of the opposite blade, the blade 9 is bolted in place as viewed in Fig. 4.

In this very simple way, we have provided an effectual means for preventing the accumulation and packing of stalks and dirt in the cutting reel or cylinder of the machine. This is all accomplished by the use of this replaceable partition, which can be renewed at any time by simply moving the cutter or blade 9 and pulling out the old one and inserting a new one in its place.

By the use of this device and the exercise of very little care, the stalks and dirt will never become packed and jammed in the reel or cylinder and, thus, the difficulties heretofore experienced are entirely overcome.

Figure 7:
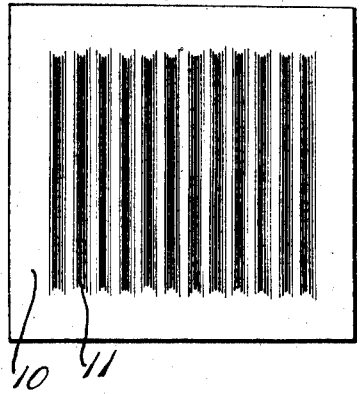
Figure 5:
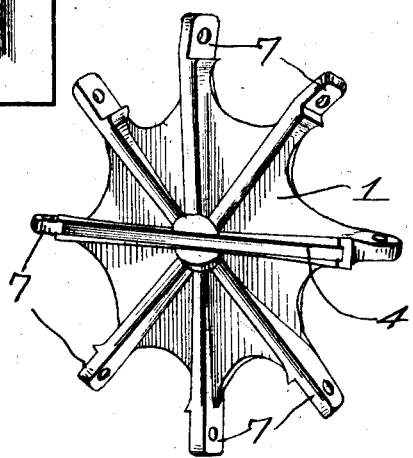
Fig. 5 is an inside view of one of the cylinder spiders.

The partition 5 might be made of metal, such as sheet-iron, in which event the grooves 4 would be unnecessary as the edges could be held between lugs forming grooves in lieu of the form of the grooves 4, and the knives or cutters could rest on the two edges to hold the partition in, as for example shown in Figs. 6 and 7, in which the edges of a sheet metal partition 10, preferably having a corrugated center 11, are inserted between lugs 12 through the center of the spider. This is but one of many different forms of metal partitions which might be employed.

We claim:—

1. A cutting reel for stalk cutters including supporting means having oppositely disposed spiders, said spiders having grooves on the inner faces thereof, a partition held in said grooves and extending across between the spiders, and cutting blades carried by the spiders, at least two of said cutting blades being located in alignment with the partition and removably holding said partition in place.

2. A cutting reel for stalk cutters including supporting trunnions having oppositely disposed spiders thereon, said spiders having grooves formed on the inner faces thereof, a central partition made in two parts and adapted to be inserted at the sides of the spiders betwen the grooves, and of sufficient width to form a solid partition diametrically across between the spiders, and cutting blades extending between the ends of the spiders, two of said cutting blades being located in alignment with the partition and removably holding said partition in place.

In testimony whereof we affix our signatures.

JOHN A. McKAY.
PATRICK H. LYNCH.